United States Patent
Peters et al.

(10) Patent No.: US 10,435,541 B2
(45) Date of Patent: Oct. 8, 2019

(54) RUBBER MIXTURE AND VEHICLE TIRES

(71) Applicant: Continental Reifen Deutschland GmbH, Hannover (DE)

(72) Inventors: Fabian Peters, Hannover (DE); Katharina Herzog, Harsum (DE); Thomas Kramer, Herford (DE); Thomas Mueller-Wilke, Lauenhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 38 days.

(21) Appl. No.: 15/836,434

(22) Filed: Dec. 8, 2017

(65) Prior Publication Data

US 2018/0100057 A1  Apr. 12, 2018

Related U.S. Application Data

(63) Continuation of application No. PCT/EP2016/056203, filed on Mar. 22, 2016.

(30) Foreign Application Priority Data

Jun. 12, 2015 (DE) .................. 10 2015 210 840

(51) Int. Cl.
| | |
|---|---|
| *C08L 23/22* | (2006.01) |
| *C08L 7/00* | (2006.01) |
| *B29B 7/74* | (2006.01) |
| *B60C 1/00* | (2006.01) |
| *C08K 3/013* | (2018.01) |
| *B60C 11/00* | (2006.01) |
| *C08C 19/20* | (2006.01) |
| *C08K 3/04* | (2006.01) |
| *C08L 25/10* | (2006.01) |

(52) U.S. Cl.
CPC .............. *C08L 7/00* (2013.01); *B29B 7/7495* (2013.01); *B60C 1/0016* (2013.01); *B60C 11/005* (2013.01); *C08C 19/20* (2013.01); *C08K 3/013* (2018.01); *C08K 3/04* (2013.01); *C08L 23/22* (2013.01); *C08L 25/10* (2013.01); *C08L 2312/00* (2013.01)

(58) Field of Classification Search
CPC ........ B29B 7/7495; C08L 23/22; C08L 25/10; C08L 7/00; C08L 2312/00; B60C 1/0016; B60C 11/005
See application file for complete search history.

(56) References Cited

U.S. PATENT DOCUMENTS

| | | | |
|---|---|---|---|
| 8,182,626 B2 | 5/2012 | Recker et al. | |
| 8,450,424 B2* | 5/2013 | Koelle et al. ......... | B60C 1/0016 524/525 |
| 9,034,980 B2* | 5/2015 | Recker et al. ........ | B60C 1/0016 152/209.1 |
| 9,631,074 B2* | 4/2017 | Peters et al. ......... | B60C 1/0016 |
| 2011/0030242 A1 | 2/2011 | Box et al. | |
| 2013/0131240 A1 | 5/2013 | Uekita et al. | |
| 2014/0251519 A1* | 9/2014 | Piffard et al. ....... | B60C 11/0332 152/209.5 |

FOREIGN PATENT DOCUMENTS

| | | |
|---|---|---|
| EP | 2746323 A1 | 6/2014 |
| JP | 2010-159376 A | 7/2010 |
| JP | 2011-236368 A | 11/2011 |
| JP | 2012-144643 A | 8/2012 |

OTHER PUBLICATIONS

International Search Report dated May 3, 2016 of international application PCT/EP2016/056203 on which this application is based.

* cited by examiner

*Primary Examiner* — Nathan M Nutter

(57) ABSTRACT

Disclosed are sulfur-crosslinkable rubber mixtures for the base of treads having a cap/base construction of vehicle tires, and a vehicle tire comprising the sulfur-crosslinkable rubber mixtures. The disclosed rubber mixture comprises: at least one diene rubber, 15 to 55 phr of at least one filler, at least one hydrocarbon resin comprising 25% to 100% by weight of aromatic monomers, having a softening point according to ASTM E 28 (ring and ball) of 70° C. to 130° C., and 0 phr of further plasticizers, that is, the sulfur-crosslinkable rubber mixture is free from further plasticizers.

5 Claims, No Drawings

RUBBER MIXTURE AND VEHICLE TIRES

CROSS REFERENCE TO RELATED APPLICATIONS

This application is a continuation application of international patent application PCT/EP2016/056203, filed Mar. 22, 2016 designating the United States and claiming priority from German application 10 2015 210 840.6, filed Jun. 12, 2015, and the entire content of both applications is incorporated herein by reference.

FIELD OF THE INVENTION

The invention relates to a sulfur-crosslinkable rubber mixture, in particular for the sidewall of vehicle tires, and relates to a vehicle tire comprising the same.

BACKGROUND OF THE INVENTION

The rubber mixture for the sidewall of vehicle tires is typically configured to exhibit a high abrasion resistance and a high fatigue and crack resistance in operation, wherein at the same time a lowest possible rolling resistance is to be achieved.

JP 2011236368 discloses, for example, a rubber mixture containing 3 to 40 phr of a liquid resin having a softening point of −20° C. to +20° C. in order to achieve a good compromise in the conflict between rolling resistance, crack resistance, stability (in vehicle tires), and processability.

JP 2012144643 discloses a rubber mixture containing a combination of oil and hydrocarbon resins that achieves an improvement in rolling resistance indicators.

JP 2010159376 A also discloses a rubber mixture containing a combination of oil and hydrocarbon resin (petroleum resin), wherein partially improved rolling resistance indicators are disclosed.

US 2011/030242 discloses a rubber mixture containing 5 to 30 phr of a vegetable oil instead of an aromatic oil in combination with tin-functionalized SBR, wherein here too partially enhanced rolling resistance indicators and partially improved crack resistances are disclosed.

SUMMARY OF THE INVENTION

It is provided herein a sulfur-crosslinkable rubber mixture, in particular for the sidewall of vehicle tires, that exhibits excellent performance in terms of the conflict between rolling resistance and tensile properties.

This is achieved by a sulfur-crosslinkable rubber mixture containing:
  at least one diene rubber,
  15 to 55 phr of at least one filler,
  at least one hydrocarbon resin comprising 25% to 100% by weight of aromatic monomers and having a softening point according to ASTM E 28 (ring and ball) of 70° C. to 130° C., and
  0 phr of further plasticizers.

Also provided is a vehicle tire that exhibits excellent performance in terms of the conflict between rolling resistance and tensile properties and in particular good structural durability in terms of tensile properties.

This is achieved when the vehicle tire comprises, at least in the sidewall, at least one vulcanizate of at least one sulfur-crosslinkable rubber mixture having the above-mentioned features.

Vehicle tires containing the disclosed rubber mixture at least in the sidewall exhibit excellent performance in terms of tensile properties coupled with identical or even improved rolling resistance.

In this context, vehicle tires are understood to mean pneumatic vehicle tires and solid rubber tires, including tires for industrial and construction site vehicles, and truck, car, and two-wheeler tires.

The rubber mixture disclosed herein is in addition also suitable for other components of vehicle tires, for example tread, flange profile, and inner tire components.

The disclosed rubber mixtures are in addition also suitable for other technical rubber articles, such as bellows, conveyor belts, air springs, belts, drive belts or hoses, and also shoe soles.

DESCRIPTION OF THE PREFERRED EMBODIMENTS OF THE INVENTION

There follows a detailed description of the constituents of the disclosed sulfur-crosslinkable rubber mixtures. All indications also apply to vehicle tires that comprise the disclosed rubber mixtures at least in the sidewall The unit "phr" (parts per hundred parts of rubber by weight) used in this document is the standard unit of amount for blend recipes in the rubber industry. In this document the metered addition of the parts by weight of the individual substances is based on 100 parts by weight of the overall mass of all high molecular weight (weight-average Mw of the molecular weight according to GPC of 250000 to 5000000 g/mol) and thus solid rubbers present in the mixture.

The rubber mixtures disclosed herein contain at least one diene rubber.

All diene rubbers present have a weight-average Mw of the molecular weight according to GPC of 250000 to 5000000 g/mol.

The term "diene rubbers" refers to rubbers formed by polymerization or copolymerization of dienes and/or cycloalkenes and thus have C═C double bonds either in the main chain or in the side groups. NR and IR are likewise diene rubbers.

The diene rubber is natural polyisoprene (NR) and/or synthetic polyisoprene (IR) and/or polybutadiene (BR, butadiene rubber) and/or styrene-butadiene copolymer (SBR, styrene-butadiene rubber) and/or epoxidized polyisoprene and/or styrene-isoprene rubber and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber, or ethylene-propylene-diene rubber are employed in the production of technical rubber articles, such as belts, drive belts and hoses, and/or shoe soles.

However, in one embodiment the one or more diene rubbers are natural polyisoprene (NR) and/or synthetic polyisoprene (IR) and/or polybutadiene (BR, butadiene rubber) and/or styrene-butadiene copolymer (SBR, styrene-butadiene rubber), particularly preferably natural polyisoprene (NR) and/or synthetic polyisoprene (IR) and/or polybutadiene (butadiene rubber).

In another embodiment the rubber mixture contains natural polyisoprene (NR) and polybutadiene, namely preferably 10 to 40 phr of NR and 60 to 90 phr of BR, particularly preferably 25 to 40 phr of NR and 60 to 75 phr of BR. Such a rubber mixture achieves particularly good properties in terms of the requirements in the sidewall (conflict between abrasion, rolling resistance, and tensile properties).

The natural and/or synthetic polyisoprene can be either cis-1,4-polyisoprene or 3,4-polyisoprene, such as the use of cis-1,4-polyisoprenes with a cis-1,4 content >90% by weight. Firstly, one can obtain such a polyisoprene by stereospecific polymerization in solution with Ziegler-Natta catalysts or using finely divided lithium alkyls. Secondly, natural rubber (NR) is one such cis-1,4-polyisoprene; the cis-1,4 content in the natural rubber is greater than 99% by weight.

In addition, a mixture of one or more natural polyisoprenes with one or more synthetic polyisoprenes can be used.

The butadiene rubber (=BR, polybutadiene) can be any type known to those skilled in the art. This includes so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li-BR (lithium-catalyzed butadiene rubber) having a cis content of 20% to 50% by weight. A high-cis BR achieves particularly good abrasion properties and low hysteresis of the rubber mixture. The one or more polybutadienes employed can be end group-modified with modifications and functionalizations and/or functionalized along the polymer chains. The modifications can be modifications having hydroxyl groups and/or ethoxy groups and/or epoxy groups and/or siloxane groups and/or amino groups and/or aminosiloxane and/or carboxyl groups and/or phthalocyanine groups and/or silanesulfide groups. However, further modifications known to those skilled in the art, also known as functionalizations, are also suitable. Metal atoms can be a constituent of such functionalizations.

In the case where styrene-butadiene rubber (styrene-butadiene copolymer) is present in the rubber mixture this can be either solution-polymerized styrene-butadiene rubber (SSBR) or emulsion-polymerized styrene-butadiene rubber (ESBR), a mixture of at least one SSBR and at least one ESBR also being employable. The terms "styrene-butadiene rubber" and "styrene-butadiene copolymer" are used synonymously in the context of the present invention.

The employed styrene-butadiene copolymer can be end group-modified and/or functionalized along the polymer chains with the modifications and functionalizations recited above for the polybutadiene.

In one embodiment, the rubber mixture contains 15 to 55 phr of at least one filler.

These fillers can include carbon black, silica and further known polar and/or nonpolar fillers, such as aluminosilicates, kaolin, chalk, starch, magnesium oxide, titanium dioxide or rubber gels and also carbon nanotubes (carbon nanotubes (CNT) including discrete CNTs, so-called hollow carbon fibers (HCF) and modified CNT containing one or more functional groups, such as hydroxyl, carboxyl, and carbonyl groups), graphite and graphene and so-called "carbon-silica dual-phase filler" and also fibers (for example aramid fibers, glass fibers, carbon fibers, cellulose fibers).

In another embodiment, zinc oxide does not belong to the group of fillers.

The rubber mixture can contain 15 phr to 55 phr of at least one carbon black.

In another embodiment, all carbon black types known to those skilled in the art can be included. In a further embodiment, a carbon black can be employed having an iodine adsorption number according to ASTM D 1510 of 20 to 180 g/kg, or 30 to 130 g/kg, and a DBP number according to ASTM D 2414 of 30 to 200 mL/100 g, 90 to 180 mL/100 g, or 90 to 150 mL/100 g.

This achieves particularly good rolling resistance indicators (rebound resilience at 70° C.) and tensile properties for use in vehicle tires, in particular in the sidewall.

In a further embodiment, the rubber mixture contains 15 to 55 phr of at least one carbon black and no further filler, i.e. 0 phr of further fillers.

In a further embodiment, the rubber mixture contains 15 to 54.9 phr of at least one carbon black and at least one further filler, such as silica, in amounts of 0.1 to 10 phr, or 0.1 to 2 phr, wherein the total amount of fillers does not exceed 55 phr. At an amount of more than 55 phr of filler(s) the advantage surprisingly achieved with the disclosed rubber mixtures in the conflict between rolling resistance and tensile properties is reduced.

At an amount of >10 phr of silica, the requirements in terms of the object to be achieved, namely an improvement in the conflict between rolling resistance and tensile properties, are not optimally achieved. Particularly for the use of the rubber mixture in the sidewall or the tread or the flange profile of vehicle tires an amount of >10 phr of silica also does not ensure sufficient electrical conductivity.

The silicas can be the silicas known to those skilled in the art that are suitable as filler for tire rubber mixtures.

To improve processability and to effect binding of the silica and any other polar fillers present to the diene rubber, silane coupling agents can be employed in the disclosed rubber mixtures. One or more different silane coupling agents can be employed in combination with one another here.

In addition, the rubber mixture can contain further activators and/or agents for the binding of fillers, such as carbon black.

This can be, for example, the compound S-(3-aminopropyl)thiosulfuric acid disclosed in US 2013/0131240, for example, and/or metal salts thereof, whereby very good physical properties of the rubber mixture, for instance in combination with at least one carbon black as filler, are achieved.

The recited silanes and activators are added in the production of the rubber mixture preferably in at least one preliminary mixing stage.

In one embodiment, the disclosed rubber mixtures contain at least one hydrocarbon resin comprising 25% to 100% by weight of aromatic monomers and having a softening point according to ASTM E 28 (ring and ball) of 70° C. to 130° C.

The rubber mixtures disclosed herein contain 5 to 20 phr, 10 to 20 phr, or 13 to 20 phr, of the at least one hydrocarbon resin. Surprisingly, such amounts of hydrocarbon resin in combination with the further constituents disclosed herein results in an improvement in the conflict between rolling resistance and tensile properties while other properties, for example hardness, remain unchanged.

It will be clear to those skilled in the art that hydrocarbon resins are polymers constructed from monomers, wherein the hydrocarbon resin is formally constructed from derivatives of the monomers by linkage of the monomers to one another. The term "hydrocarbon resins" encompasses in the context of the present application resins comprising carbon atoms and hydrogen atoms and optionally heteroatoms, such as in particular oxygen atoms.

The hydrocarbon resin can be a homopolymer and/or a copolymer. The term "homopolymer" is to be understood as meaning in the present application a polymer that, according to Römpp Online Version 3.28, "has formed from monomers of only one type".

The term "copolymer" as used herein is to be understood as meaning a polymer constructed from a plurality, that is, two or more, different monomers. The hydrocarbon resin can therefore also be a copolymer of three different monomers, for example.

For the sake of simplicity, a hydrocarbon resin comprising 25% to 100% by weight (percent by weight based on the total mass of the hydrocarbon resin) of aromatic monomers is referred to herein as hydrocarbon resin.

In a further embodiment, the hydrocarbon resins disclosed herein comprise 51% to 100% by weight, that is, predominantly, from aromatic monomers. In one embodiment, the predominantly aromatic hydrocarbon resin comprises 60% to 100% by weight, 70% to 100% by weight, 80% to 100% by weight, or 90% to 100% by weight, of aromatic monomers. This results in particularly good properties of the rubber mixtures in terms of the conflict between rolling resistance and tensile properties, wherein in particular crack propagation resistance is improved.

In another embodiment, the disclosed hydrocarbon resins comprise 100% by weight of aromatic monomers and are accordingly aromatic hydrocarbon resins. This results in a particularly good property of the rubber mixtures in terms of the conflict between rolling resistance and tensile properties, wherein in particular crack propagation resistance is improved.

In another embodiment in which the hydrocarbon resin comprises 51% to 100% by weight of aromatic monomers, the monomer is referred to for simplicity as "predominantly aromatic hydrocarbon resin" since more than half of the weight consists of aromatic constituents (monomers).

Among the hydrocarbon resins and the predominantly aromatic hydrocarbon resins, hydrocarbon resins that are copolymers of aromatic and nonaromatic (aliphatic) monomers are accordingly included in the rubber mixtures disclosed herein.

In the embodiments in which the hydrocarbon resins comprise less than 100% by weight, that is, 25 to 99.9999% by weight, of aromatic monomers, the hydrocarbon resins then also contain nonaromatic, that is, aliphatic, monomers. The aliphatic monomers can be monomers from the $C_5$-mineral oil fraction, for example isoprene, and/or monomers of terpenes and/or cycloolefins and/or olefins, for example pentene. The term "$C_5$" is to be understood as meaning that these monomers are constructed from five carbon atoms. The $C_5$-mineral oil fraction can further contain monomers (building blocks) having four, that is, $C_4$-monomers, or six carbon atoms, $C_6$-monomers.

According to the Römpp Online Lexikon, Version 3.36, "aliphatic compounds" is an "umbrella term [ . . . ] for functionalized or nonfunctionalized organic compounds containing no aromatic ring system."

Terpenes included herein are defined according to the Römpp Online Lexikon, 2015, as " . . . the terpene hydrocarbons $C_{10}H_{16}$ and the hydrogenation and dehydrogenation derivatives thereof but also the alcohols (terpene alcohols), ketones, aldehydes and esters derived therefrom . . . ." Terpenes include, for example, limonene, alpha-pinene, beta-pinene, geraniol, terpineol, and myrcene. Monomers of terpenes can be mono- and/or bicyclic terpenes.

In some embodiments disclosed herein in which the hydrocarbon resin comprises 100% by weight of aromatic monomers, the monomer is referred to for simplicity as "aromatic hydrocarbon resin".

The aromatic monomers of all embodiments disclosed herein are selected from alpha-methylstyrene and/or styrene and/or vinyltoluene and/or tert-butylstyrene and/or indene and/or coumarone and/or methylindene and/or methylcoumarone and/or phenol.

In another embodiment, the aromatic monomers of all embodiments are selected from alpha-methylstyrene and/or styrene and/or vinyltoluene and/or tert-butylstyrene and/or indene and/or coumarone and/or methylindene and/or methylcoumarone and/or phenol.

In another embodiment, the at least one hydrocarbon resin is a copolymer constructed from at least one aromatic monomer from alpha-methylstyrene and/or styrene and/or vinyltoluene and/or tert-butylstyrene and/or indene and/or coumarone and/or methylindene and/or methylcoumarone and/or phenol.

The vinyltoluene (also ar-methylstyrene) can be p-vinyltoluene and/or m-vinyltoluene and/or o-vinyltoluene.

The tert-butylstyrene can be p-tert-butylstyrene and/or m-tert-butylstyrene.

In a further embodiment, the disclosed hydrocarbon resins comprise alpha-methylstyrene and/or styrene, in an amount of 25% to 100% by weight, or 51% to 100% by weight, from alpha-methylstyrene and/or styrene. It is conceivable here for example that aliphatic monomers are present to an extent of 0% to 70% by weight, or 0% to 49% by weight, for example 5% by weight, as a result of which starting from 100% by weight the proportion of aromatic monomers is accordingly reduced.

The disclosed aromatic hydrocarbon resin can be constructed from alpha-methylstyrene and styrene and is thus a copolymer of alpha-methylstyrene and styrene, these comprising as much as 100% by weight of alpha-methylstyrene and styrene. This results in a particularly good performance of the rubber mixtures in terms of the conflict between rolling resistance and tensile properties.

In a further embodiment, the hydrocarbon resin is constructed from at least indene and coumarone and is thus a copolymer of indene and coumarone, these comprising as much as 25% to 100% by weight, 51% to 100% by weight, or 70% to 100% by weight, of indene and coumarone. It is conceivable here for example that further aromatic and/or aliphatic monomers are present to an extent of 0% to 70% by weight, or 0% to 49% by weight, for example 5% by weight, as a result of which starting from 100% by weight the proportion of indene and coumarone is accordingly reduced.

This results in a particularly good performance of the rubber mixtures in terms of the conflict between rolling resistance and tensile properties, such as in particular an improvement in crack propagation resistance.

In a further embodiment, the hydrocarbon resin is constructed from at least one terpene, comprising as much as 25% to 80%, 25% to 50%, or 31% to 50% by weight, of aromatic monomers. This results in a particularly good performance of the rubber mixtures in terms of the conflict between rolling resistance and tensile properties.

The hydrocarbon resin present in the rubber mixtures disclosed herein has a softening point according to ASTM E 28 (ring and ball) of 70° C. to 130° C.

In one embodiment a softening point according to ASTM E 28 (ring and ball) of 70° C. to 100° C., or 80° C. to 95° C., is achieved. Such a hydrocarbon resin is available, for example, under the trade name SYLVATRAXX® 4401 from Arizona Chemical Company or an indene-coumarone resin having a softening point of for example 85° C. to 95° C., or 88° C. 92° C., for example Novares C90 from Rütgers Novares GmbH.

In a further embodiment, a softening point according to ASTM E 28 (ring and ball) of 100° C. to 130° C., or 110° C. to 130° C., is achieved.

In addition, the hydrocarbon resin present in the disclosed rubber mixtures has a molecular weight Mw (weight-average) of 500 to 5000 g/mol, 500 to 3000 g/mol, 500 to 2500 g/mol, 800 to 2500 g/mol, or 800 to 2000 g/mol. Such a hydrocarbon resin having a molecular weight Mw of 1300 g/mol is obtainable for example under the trade name SYLVATRAXX® 4401 from Arizona Chemical Company. A further such hydrocarbon resin having a molecular weight Mw of 1100 g/mol is obtainable for example under the trade name Novares C90 from Rütgers Novares GmbH.

Determination of the molecular weight (weight-average Mw and centrifuge average Mz) is effected by gel permeation chromatography according to DIN 55672-1 (GPC with tetrahydrofuran as eluent, polystyrene standard; size exclusion chromatography).

Apart from at least one described hydrocarbon resin, the rubber mixtures disclosed herein contain no further plasticizer, that is, 0 phr of further plasticizers, that is, the mixture is free from further plasticizers.

The at least one above-described hydrocarbon resin having a softening point of 70° C. to 130° C. thus replaces plasticizers such as oils in the rubber mixture to surprisingly result in excellent performance in the conflict between rolling resistance and tensile properties. This also results in advantages during the processing of the rubber mixture, in particular during metered addition, since compared to the prior art metered addition of oil and resin is not necessary.

The term "plasticizers" as used herein is to be understood as meaning all plasticizers known to those skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL), such as those having a content of polycyclic aromatics of less than 3% by weight according to method IP 346, or factices or plasticizer resins not included among the tackifying resins recited below, or liquid polymers having an average molecular weight (determination by GPC=gel permeation chromatography, based on BS ISO 11344:2004) between 500 and 20000 g/mol.

In addition, the rubber mixture can contain customary additives in customary weight fractions that are optionally added in at least one preliminary mixing stage in the course of production thereof. These additives include:

a) aging inhibitors, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, for example zinc oxide and fatty acids (for example, stearic acid) or zinc complexes, for example zinc ethylhexanoate, c) waxes, d) masticating aids, for example 2,2'-dibenzamidodiphenyl disulfide (DBD) and e) processing aids, for example fatty acid salts, for example zinc soaps, and fatty acid esters and derivatives thereof.

The fraction of the total amount of further additives is 3 to 150 phr, 3 to 100 phr, or 5 to 80 phr.

The total fraction of further additives also includes 0.1 to 10 phr, 1 to 8 phr, or 1.5 to 4 phr, of zinc oxide (ZnO).

This can be any type of zinc oxide known to those skilled in the art, for example ZnO granulate or powder. The conventionally used zinc oxide generally has a BET surface area of less than 10 m²/g. However, it is also possible to use a zinc oxide having a BET surface area of 10 to 100 m²/g, for example so-called "nano-zinc oxides."

It is customary to add zinc oxide as an activator to a rubber mixture for sulfur crosslinking with vulcanization accelerators, usually in combination with fatty acids (for example, stearic acid). The sulfur is then activated for the vulcanization by complex formation.

The rubber mixture can also contain adhesive systems, for example cobalt salts and reinforcer resins (for example, resorcinol-HMMM/HMT) for use in body mixtures, in particular rubberization mixtures.

The vulcanization of the sulfur-crosslinkable rubber mixtures disclosed herein is performed in the presence of sulfur and/or sulfur donors with the aid of vulcanization accelerators, wherein a number of vulcanization accelerators can simultaneously act as sulfur donors. The accelerator is one or more of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

For instance, a sulfenamide accelerator can be one or more of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS).

Sulfur-donating substances used can be any sulfur-donating substances known to those skilled in the art. If the rubber mixture contains a sulfur-donating substance, it can be one or more of thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (for example, Rhenocure SDT 50®, Rheinchemie GmbH) and/or zinc dichloryldithiophosphate (for example, Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems as obtainable, for example, under the Vulkuren®, Duralink® or Perkalink® trade names or networkforming systems as described in U58,182,626 can also be used in the rubber mixture. This system contains a vulcanizing agent that crosslinks with a functionality of greater than four and at least one vulcanization accelerator. The vulcanizing agent which crosslinks with a functionality of greater than four has, for example, the general formula A):

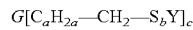

A)

wherein G is a polyvalent cyclic hydrocarbon group and/or a polyvalent heterohydrocarbon group and/or a polyvalent siloxane group containing 1 to 100 atoms; wherein each Y is selected independently from a rubber-active group containing sulfur-containing functionalities; and wherein a, b and c are integers where, independently, a=0 to 6; b=0 to 8; and c=3 to 5.

The rubber-active group can be selected from a thiosulfonate group, a dithiocarbamate group, a thiocarbonyl group, a mercapto group, a hydrocarbon group and a sodium thiosulfonate group (Bunte salt group).

Very good abrasion and tensile properties of the disclosed rubber mixtures are achieved in this way.

As used herein, the term "vulcanizing agent" includes sulfur and sulfur donors, including sulfur-donating silanes such as TESPT, and vulcanization accelerators as described above and vulcanizing agents which crosslink with a functionality of greater than four, as described in U.S. Pat. No. 8,182,626, for example, a vulcanizing agent of the formula A), and also the abovementioned Vulkuren®, Duralink®, and Perkalink® systems.

In the course of production, to the rubber mixtures disclosed herein at least one vulcanizing agent can be added, that is one or more of sulfur and/or sulfur donors and/or vulcanization accelerators and/or vulcanizing agents that crosslink with a functionality of greater than four in the final mixing stage. This makes it possible to produce a sulfur-crosslinked rubber mixture, in particular for use in vehicle tires, from the mixed final mixture by vulcanization.

In one embodiment, the accelerators TBBS and/or CBS and/or diphenylguanidine (DPG) are employed.

In addition, vulcanization retarders can be present in the rubber mixture.

The terms "vulcanized" and "crosslinked" are used synonymously herein.

In one development in the course of production of the sulfur-crosslinkable rubber mixture, a plurality of accelerators are added in the final mixing stage.

The sulfur-crosslinkable rubber mixture can be produced by the process customary in the rubber industry in which initially, in one or more mixing stages, a preliminary mixture comprising all constituents except the vulcanization system (sulfur and vulcanization-influencing substances) is produced. The final mixture is produced by adding the vulcanization system in a final mixing stage. The final mixture is subjected to further processing and brought into the appropriate shape for example by an extrusion procedure or calendering.

This is followed by further processing by vulcanization, wherein owing to the vulcanization system added in the context of the present invention sulfur crosslinking takes place.

The above-described rubber mixtures are suitable for use in vehicle tires, such as pneumatic vehicle tires. Use in all tire components is conceivable in principle, in particular the sidewall and optionally in at least one inner component or the tread, wherein in two-part treads (upper part: cap and lower part: base), the rubber mixtures disclosed herein can be used both for the cap and for the base.

The term "body mixture" as used herein describes the rubber mixtures for the components of a tire that are not part of the tread, namely in particular not only the sidewall but also tire components such as the squeegee, inner liner, core profile, belt, shoulder, belt profile, carcass, bead reinforcement, bead profile, flange profile and bandage.

For use in vehicle tires the mixture as a finished mixture prior to vulcanization can be brought into the shape of a sidewall and during production of the green vehicle tire is applied in the known manner.

The production of the rubber mixtures disclosed herein for use as tread or body mixtures in vehicle tires is effected as described above for the sidewall. The difference is in the shaping after the extrusion procedure/the calendering of the mixture. The thus obtained shapes of the as yet unvulcanized rubber mixture for one or more different body mixtures then serve for the construction of a green tire. For use of the rubber mixture according to the invention in drive belts and other belts, especially in conveyor belts, the extruded, as yet unvulcanized mixture is brought into the appropriate shape and often provided at the same time or subsequently with strength members, for example synthetic fibers or steel cords. This usually affords a multilayer construction consisting of one and/or more plies of rubber mixture, one and/or more plies of identical and/or different strength members and one and/or more further plies of the same and/or another rubber mixture.

Below are provided certain comparative examples and working examples that are summarized in Table 1.

The comparative mixtures are identified with a C, the inventive mixtures with an I.

The mixtures were produced by the method customary in the rubber industry under standard conditions in three stages in a laboratory mixer where initially in the first mixing stage (preliminary mixing stage) all constituents except the vulcanization system (sulfur and vulcanization-influencing substances) were mixed. In the second mixing stage the preliminary mixture was mixed again. By addition of the vulcanization system in the third stage (final mixing stage) the final mixture was produced, mixing being performed at 90° to 120° C. The final mixtures were then subjected to further processing by an extrusion procedure.

All mixtures were used to produce test specimens by vulcanization after 20 minutes under pressure at 160° C. and these test specimens were used to determine material properties typical for the rubber industry with the test methods specified hereinafter.

Shore A hardness at room temperature (RT) according to DIN ISO 7619-1

Rebound resilience (Rebound) at 70° C. according to DIN 53 512

Maximum (max) loss factor tan d (tan delta, tan d) from dynamic mechanical measurement at 55° C. according to ISO 4664-1/DIN 53 513, strain sweep Tensile strength and elongation at break at room temperature according to DIN 53 504

Fatigue-crack resistance as number of load cycles until fracture of a dumbbell-shaped specimen under a continuously repeating elongation cycle at a frequency of 104±8 min-1, determined with a Monsanto Fatigue to Failure Tester (FTF for short) at 101% elongation at 23° C.; unit kC=kilocycles DeMattia according to DIN ISO 132, reported crack lengths (CL) in mm after 1000, 2000, 4000, 8000, 16000, 32000 and 64000 cycles Substances Used

[a)] NR: TSR natural rubber

[b)] butadiene rubber, high cis CO-BR, Mw=550000 g/mol, cis content >=95%

[c)] N550 carbon black

[d)] Plasticizer: RAE

[e)] Hydrocarbon resin: SYLVATRAXX® 4401 from Arizona Chemical Company

[f)] Hydrocarbon resin: Novares C 90 from Rutgers Novares GmbH

[g)] additives: incl. sulfur-containing vulcanization system

TABLE 1

| Constituents | Unit | C1 | I1 | I2 |
|---|---|---|---|---|
| NR a) | phr | 33 | 33 | 33 |
| BR b) | phr | 67 | 67 | 67 |
| Carbon black c) | phr | 38 | 38 | 38 |
| Plasticizer d) | phr | 14 | — | — |
| HC resin e) | phr | — | 16 | — |
| HC resin f) | phr | — | — | 16 |
| Additives g) | phr | 17.4 | 17.4 | 17.4 |
| Physical properties | | | | |
| Hardness RT | Shore A | 54 | 54 | 53 |
| Tensile strength | MPa | 11.5 | 11.9 | 14.3 |
| Elongation at break | % | 516 | 517 | 669 |
| Rebound 70° C. | % | 74.5 | 74.7 | 70.6 |
| tan d | — | 0.059 | 0.057 | 0.079 |
| FTF | kC | 210 | 267 | 164 |
| CL 1000 | mm | 6.4 | 2.2 | 2.1 |
| CL 2000 | mm | 10.8 | 4.5 | 2.3 |
| CL 4000 | mm | 22.9 | 8.8 | 3.0 |
| CL 8000 | mm | 25.0 | 19.5 | 5.9 |
| CL 16000 | mm | — | 25.0 | 11.9 |
| CL 32000 | mm | — | — | 19.5 |
| CL 64000 | mm | — | — | 25.0 |

As is apparent from Table 1 the disclosed rubber mixture I1 that contains a hydrocarbon resin instead of a plasticizer achieves a surprisingly better dynamic, structural durability while hardness and static properties (tensile strength, elongation at break) remain the same. This is apparent from the greater cycle number in the FTF fatigue test and from the smaller crack lengths in the crack propagation test (DeMattia as described above).

At the same time rolling resistance is surprisingly at an identical or even slightly improved level. As is further apparent from Table 1, the inventive rubber mixture I2 which is an example of an embodiment comprising an indene-coumarone resin achieves a markedly improved crack propagation resistance wherein a crack length of 25 mm is reached only after 64000 cycles. The rolling resistance is not significantly negatively impaired to the same extent so that here too an improvement in the conflict between rolling resistance and tensile properties, in particular crack propagation resistance, is achieved.

A vehicle tire containing the disclosed rubber mixture at least in the sidewall shows excellent structural durability, in particular after prolonged stress, while rolling resistance remains the same or is improved.

It is understood that the foregoing description is that of various embodiments and that various changes and modifications can be made thereto without departing from the spirit and scope of the disclosed rubber mixtures as defined in the appended claims.

What is claimed is:

1. A sulfur-crosslinkable rubber mixture comprising
   at least one diene rubber, wherein the at least one diene rubber comprises 10 to 40 phr of natural polyisoprene (NR) and 60 to 90 phr of polybutadiene (BR),
   15 to 55 phr of at least one filler,
   at least 5 to 20 phr of one hydrocarbon resin comprising 25% to 100% by weight of aromatic monomers and having a softening point according to ASTM E 28 of 70° C. to 130° C., wherein the at least one hydrocarbon resin comprises at least alpha-methylstyrene and styrene, and
   0 phr of plasticizers.

2. The rubber mixture according to claim 1, wherein the at least one filler is carbon black.

3. The rubber mixture according to claim 1, wherein the at least one hydrocarbon resin comprises 90% to 100% by weight of aromatic monomers.

4. The rubber mixture according to claim 1, wherein the at least one hydrocarbon resin comprises 25% to 80% by weight of aromatic monomers.

5. A vehicle tire comprising a sidewall, wherein at least the sidewall of the vehicle tire comprises at least one vulcanizate of at least one sulfur-crosslinkable rubber mixture according to claim 1.

* * * * *